Nov. 22, 1927.
W. M. BROWN
1,650,422
TOOL HEAD
Filed March 3, 1926        2 Sheets-Sheet 1
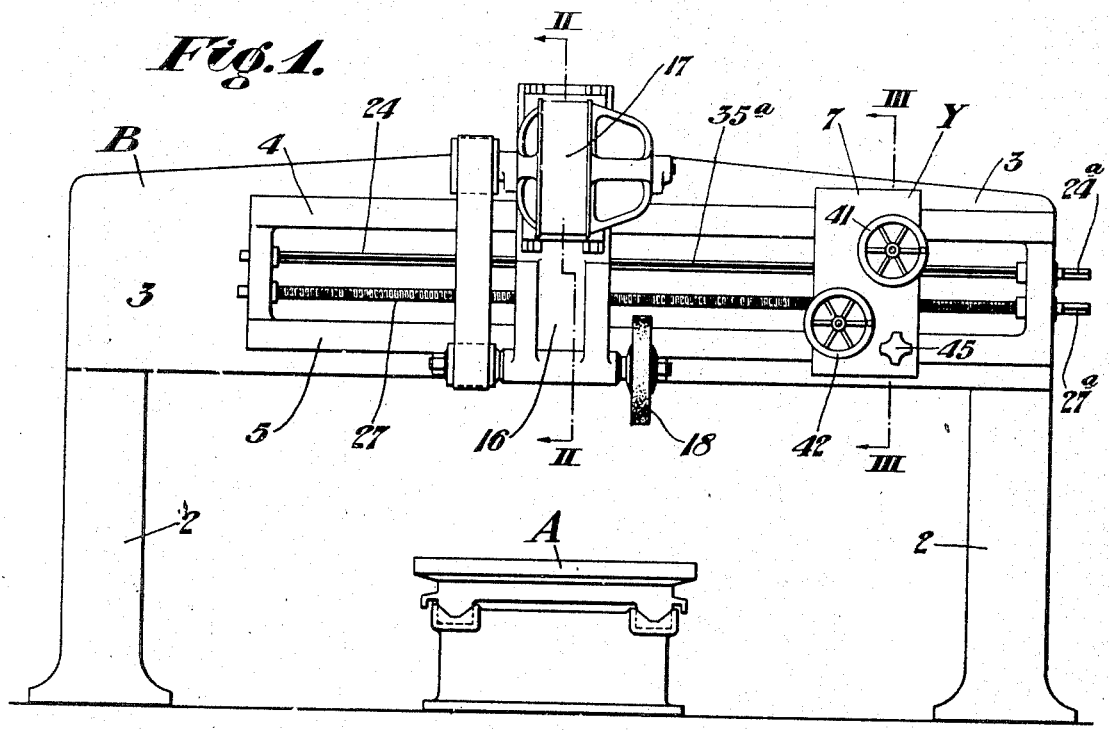
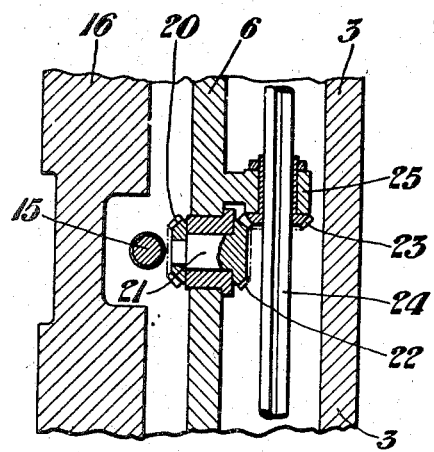
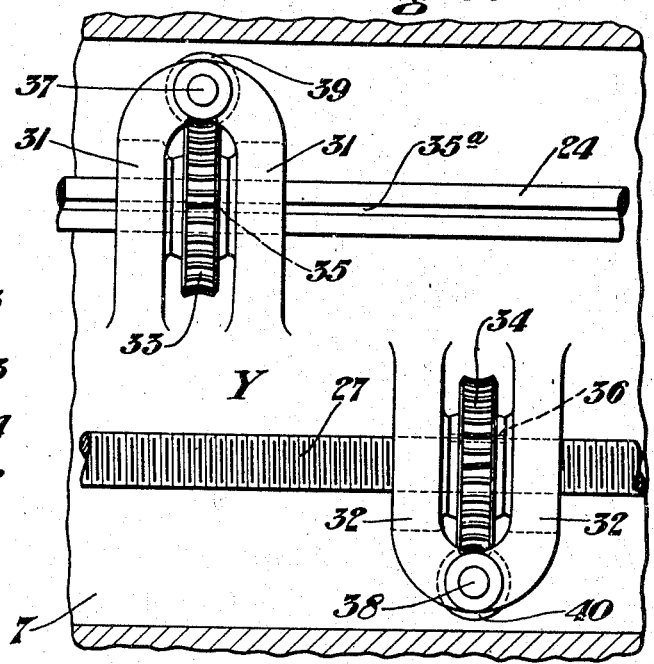
Witnesses:
Edwin Trueb
Inventor:
WILLIAM MILTON BROWN,
by D. Anthony Usina
his Attorney.

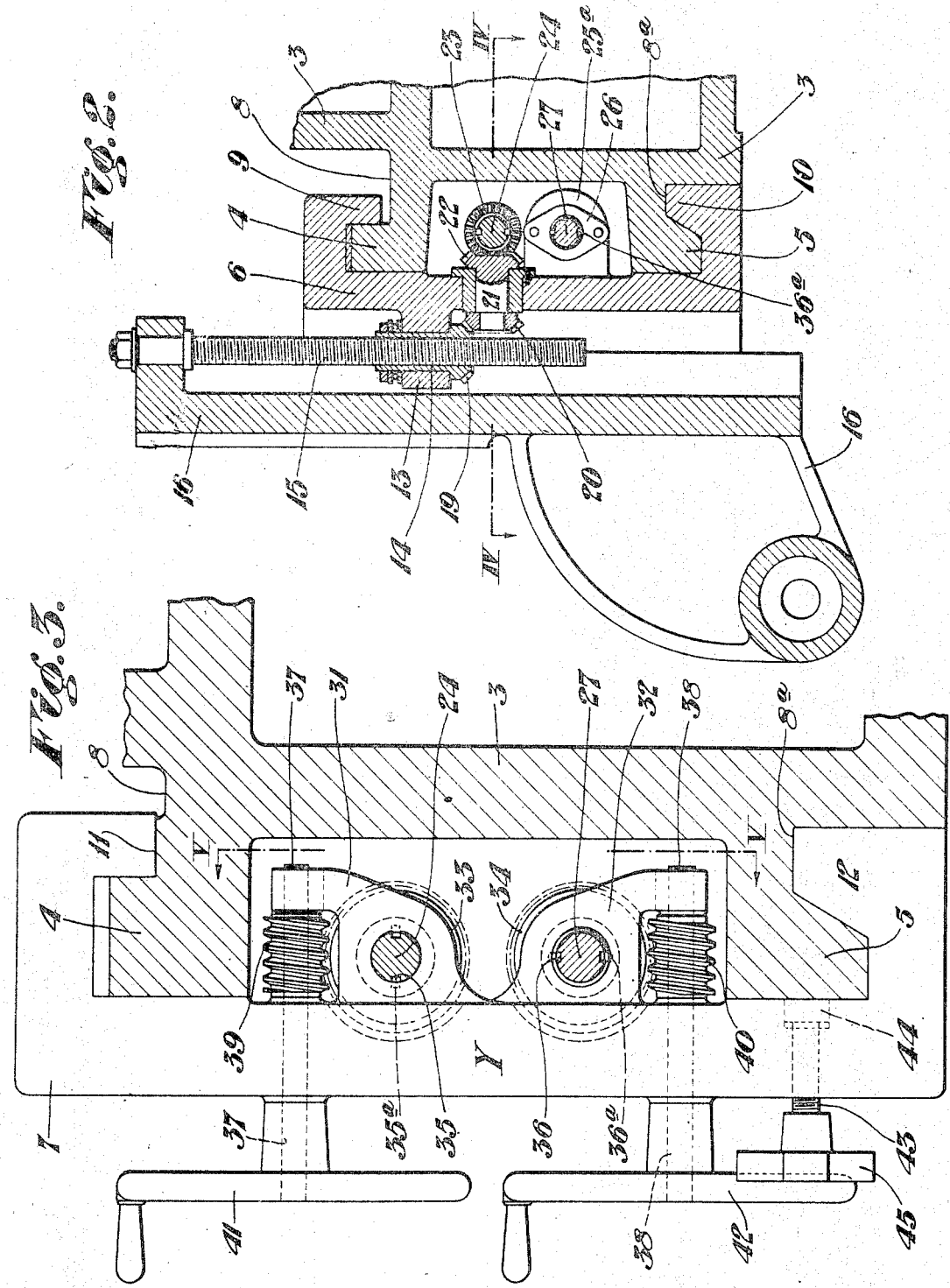

Patented Nov. 22, 1927.

1,650,422

UNITED STATES PATENT OFFICE.

WILLIAM MILTON BROWN, OF JOHNSTOWN, PENNSYLVANIA.

TOOL HEAD.

Application filed March 3, 1926. Serial No. 91,956.

This invention relates to cutting machines such as planers and the like having a tool head bridge for movably supporting the tool head over the work bed, and more particularly to means for moving or feeding the tool head relative to said bridge, and has for its object the provision of a novel operating unit for said feeding means, which unit is adjustable longitudinally of said bridge so that the operator may adjust said unit to a position where it will be convenient for him to operate for various sizes of work-pieces.

Another object is to provide an operating unit for tool head feeding mechanisms having the novel design, construction, and combination of parts hereinafter described and illustrated in the accompanying drawings.

In the drawings—

Figure 1 is an end elevation of a machine embodying my invention.

Figure 2 is a sectional view taken on the line II—II of Figure 1.

Figure 3 is a sectional view taken on the line III—III of Figure 1.

Figure 4 is a fragmentary sectional view taken on the line IV—IV of Figure 2.

Figure 5 is a sectional view taken on the line V—V of Figure 3.

Referring more particularly to the drawings, A designates the bed of a standard planer or other similar cutting machine, and B designates the tool head supporting bridge which extends over the bed A, and is composed of legs 2 and bridge-piece or truss 3.

The bridge-piece or truss 3 of the bridge B is provided with forwardly projecting longitudinal flanges 4 and 5 forming supporting tracks for a slidable tool head carriage 6, and a second carriage 7 of an operating mechanism Y to be described.

The flanges 4 and 5 are cut away as at 8 and 8ª to receive the inwardly projecting ends of track flanges 9 and 10 on the tool head carriage 6, and 11 and 12 on the operating mechanism carriage 7.

The tool head carriage 6 is provided with a tool head supporting projection 13 apertured to receive a nut 14 in which is threaded a supporting rod 15, on the upper end of which is mounted a tool head 16. The tool head 16 shown in the drawings carries a motor 17 and abrading wheel 18, although other tools may be employed.

The nut 14 is provided with a beveled gear 19 on its lower end which is in mesh with a beveled gear 20 on one end of a horizontal shaft 21 mounted in the carriage 6 and having a beveled gear 22 on its other end which is in mesh with a beveled gear 23 slidably mounted on an operating shaft 24, journaled in the bridge-piece 3 of the bridge B.

The gear 23 is slidably keyed to the shaft 24 and is journaled in a projecting bearing 25 on the carriage 6 so as to move longitudinally relative to the shaft 24 and bridge B with the carriage 6.

By rotating the shaft 24 the gears 23, 22, 20 and 19 will be rotated and, therefore, cause a rotation of the nut 14 to raise or lower the rod 15 and move the tool head 16 vertically relative to the bridge B.

The tool head carriage 6 is further provided with a projection 25ª supporting a nut 26. A threaded shaft 27 extends longitudinally of and is journaled in the bridge-piece 3 of the bridge, and has a threaded engagement with the nut 26 so that rotation of the shaft 27 will cause a horizontal movement of the tool head carriage 6 and tool head 16 longitudinally of the bridge.

The shafts 24 and 27 project beyond the end of the bridge and are provided with squared ends 24ª and 27ª, respectively, for the reception of a wrench or other tool (not shown) for turning them to adjust the position of the tool head through the mechanism above described.

The auxiliary feeding or operating mechanism Y is provided for turning the shafts 24 and 27 and is composed of the carriage 7 slidably mounted on the flanges 4 and 5 of the bridge-piece 3. The carriage 7 is provided with two pairs of inwardly projecting ears 31 and 32 which are apertured to receive the shafts 24 and 27, and worm-wheels 33 and 34 are mounted on the shafts 24 and 27, respectively, between the ears 31 and 32. The worm-wheels 33 and 34 are locked against rotation on the shafts by keys 35 and 36, respectively, which are engaged in slots 35ª and 36ª in the shafts so as to permit the worm-wheels to freely slide longitudinally of the shafts.

Worm-shafts 37 and 38 are journaled in the carriage 7 and carry worms 39 and 40, respectively, which are meshed with the worm-wheels 33 and 34, respectively, so that when the worm-shafts 37 and 38 are rotated the shafts 24 and 27 will be rotated to adjust the tool head.

The worm-shafts 37 and 38 are provided with hand-wheels 41 and 42, respectively, on their outer ends by which they may be readily rotated.

The carriage 7 is provided with a locking bolt 43 having a friction head 44 on its inner end and a hand-wheel or knob 45 on its outer end. By threading or screwing the bolt 43 inwardly its friction head will be forced into contact with the bridge-piece 3 and prevent the sliding of the carriage 30.

Heretofore, in machines of this type, the operation of the shafts 24 and 27 has been accomplished either by wrenches or tools engaged with the squared ends 24ª and 27ª, or if they are mechanically operated the control has been located at the end of the bridge, thus necessitating the operator standing at the end of the bridge to manipulate the tool head. When thus positioned the operator could not clearly see his work-piece and, therefore, when close work was desired he was at a considerable disadvantage unless he had a helper to manipulate the control.

With the present invention the operator may move the operating mechanism Y along the bridge into close proximity to the work and he may then manipulate the shafts 24 and 27 to adjust the tool head while he is in a position close to the work.

While I have shown a hand operated mechanism Y, it will be understood that I do not wish to be limited thereto, since this mechanism may be power operated if desired, and various other modifications may be made without departing from the scope of my invention as defined in the appended claims.

I claim—

1. In a cutting machine, a supporting bridge, a tool head carriage slidably mounted on said bridge for longitudinal movement, a tool head mounted on said carriage and movable vertically relative to said tool head carriage, a pair of shafts extending longitudinally of and journaled in said bridge, means cooperating with one of said shafts for moving said tool head carriage longitudinally relative to said bridge, means cooperating with the other of said shafts for moving said tool head vertically relative to said tool head carriage, and means for operating said shafts, said means comprising a carriage mounted for longitudinal movement on said bridge relative to and independent of said tool head carriage, worm-wheels slidably mounted on said shafts, worm-shafts journaled in said carriage, worm-gears on said worm-shafts and meshed with said worm-wheels, and hand-wheels for operating said worm-shafts.

2. In a cutting machine, a supporting bridge, a tool head carriage slidably mounted on said bridge for longitudinal movement, a tool head mounted on said carriage and movable vertically relative to said tool head carriage, a pair of shafts extending longitudinally of and journaled in said bridge, means cooperating with one of said shafts for moving said tool head carriage longitudinally relative to said bridge, means cooperating with the other of said shafts for moving said tool head vertically relative to said tool head carriage, and means for operating said shafts, said means comprising a carriage mounted for longitudinal movement on said bridge relative to and independent of said tool head carriage, worm-wheels slidably mounted on said shafts, worm-shafts journaled in said carriage, worm-gears on said worm-shafts and meshed with said worm-wheels, means for operating said worm-shafts, and means for locking said carriage against movement.

In testimony whereof, I have hereunto set my hand.

WILLIAM MILTON BROWN.